March 26, 1929. J. M. HISS Re. 17,243
APPARATUS FOR SUPPORTING ARCHES
Original Filed May 14, 1923 3 Sheets-Sheet 1
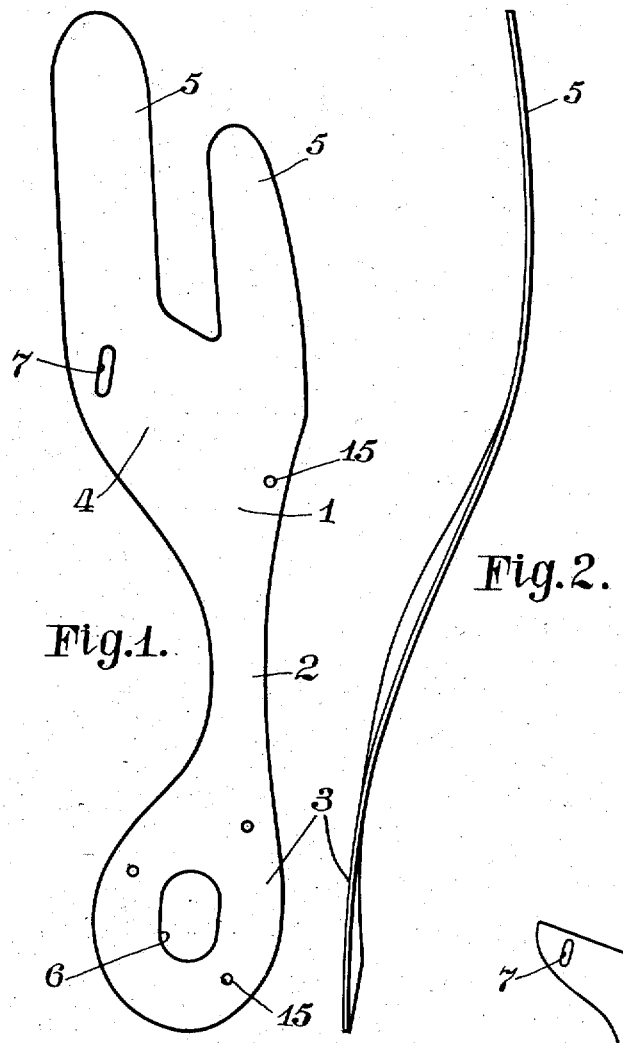
Fig.1.
Fig.2.
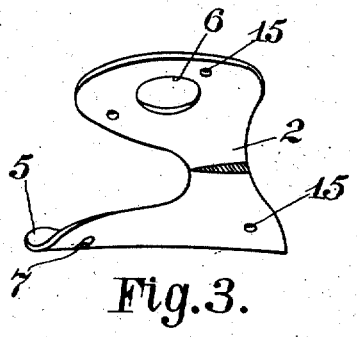
Fig.3.
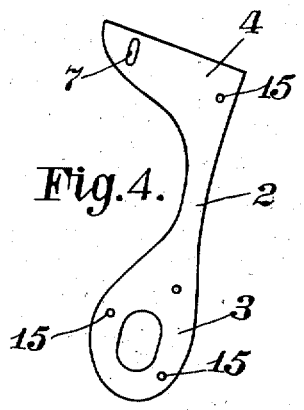
Fig.4.
Inventor
JOHN M. HISS
by Finnegan & Finnegan
his Attorneys March 26, 1929. J. M. HISS Re. 17,243

APPARATUS FOR SUPPORTING ARCHES

Original Filed May 14, 1923 3 Sheets-Sheet 2

Inventor
JOHN M. HISS
by Finnegan Finnegan
his Attorneys

APPARATUS FOR SUPPORTING ARCHES

Original Filed May 14, 1923 3 Sheets-Sheet 3

Inventor
JOHN M. HISS
by Finnegan & Finnegan
his Attorneys

Reissued Mar. 26, 1929. Re. 17,243

UNITED STATES PATENT OFFICE.

JOHN M. HISS, OF COLUMBUS, OHIO.

APPARATUS FOR SUPPORTING ARCHES.

Original No. 1,484,785, dated February 26, 1924, Serial No. 638,838, filed May 14, 1923. Application for reissue filed February 16, 1926. Serial No. 88,707.

My invention relates to an apparatus for supporting arches of the foot and has particularly to do with the provision of a novel means for supporting different parts of a fallen arch to varying degrees and gradually elevating the arch to its former height, although it is equally well adapted to the correct support of the arches of any foot.

In the prior art, it has been customary to provide variously shaped arch supports of both stiff and semi-rigid material and in some cases the support itself has been made adjustable. These efforts in the past have apparently failed because, for one reason, they have failed to provide a firm walking surface to the external tarsal arch which naturally touches and bears weight along its entire length. Another reason is that these efforts have attempted to support the arches by applying pressure directly to the internal tarsal arch and thus really causing atrophy of the very important foot muscles comprising this internal arch.

My invention contemplates the method of firmly supporting the external tarsal arch of the foot and then initially or gradually adjusting the means for fitting such arch support to only indirectly support the internal tarsal arch leaving that arch free for flexion. The result sought is accomplished by means of an improved simple, substantial and compact structure which comprises a shank adapted to be incorporated with the shoe to insure proper firm support for the external arch of the foot and at the same time to provide only indirect support for the internal arch of the foot.

One of the objects of my invention is the provision of a support of such shape and material that it will furnish stiffening to the external-lateral portion of the shank of the shoe, thereby affording a rigid support for the outer longitudinal arch.

Another object of my invention is the provision of means adapted to be inserted or placed in the shoe and which means when connected to the shoe will be effective to flexibly and indirectly support the inner longitudinal arch.

Another object of my invention has to do with the provision of means for firmly supporting the outer longitudinal arch of the foot, and which means may be adjusted to flexibly support internal arches of varying heights.

Another object of my invention contemplates the provision of a splint for the tarsal bones of the arch, in combination with the firm support for the outer longitudinal arch and the flexible indirect support for the inner longitudinal arch. The result of this combination is that the various means will be effective to grasp the instep of the foot, thereby holding the tarsal bones together.

A further object of my invention has to do with the provision of means for adjusting the inner shank of the shoe to fit any height of arch and permit gradual adjustment of such shank in order to elevate a fallen foot arch.

A further object of my invention has to do with the provision of means for massaging the foot muscles with every step. In this case the outer part of the outer longitudinal arch is firmly supported while the inner part of the arch is only more or less indirectly supported in order to permit free play and exercise of the muscles of the inner part of the arch.

A still further object of my invention has to do with the provision of flexible means designed to extend under the ball of the foot, and to give a spring step and aid locomotion without undue weight being thrown on the ball of the foot; and further, to provide means just back of said first named means and just back of the tread of the vamp, to prevent twisting of the sole when stepping on rough surfaces, and to distribute the weight across the heads of the metatarsal bones thereby avoiding undue pressure at any one point. For this purpose I have provided means for encouraging a spring forward in locomotion without undue weight on the ball of the foot; said ball being the most frequent site of inflammation, pain and callus in case of broken, weak or fallen arches.

Various other features of my invention will be apparent as this description progresses and will be brought out in the claims appended thereto. The various objects of my invention are preferably obtained by the structure illustrated in the accompanying drawings wherein like characters of reference designate corresponding parts.

In said drawings—

Figure 1 is a plan view of my arch support appliance showing the preferred form of the shank, means for permitting the adjusting of the inner arch of the shoe, and the forward projecting tongues for supporting the ball of the foot.

Figure 2 is a side elevation of the structure shown in Figure 1.

Figure 3 is an end elevation of the structure shown in Figure 1 and showing the preferred shape of such structure.

Figure 4 is a detail view of a modified form of arch support it being similar to the structure shown in Figures 1 to 4 but without the ball support extensions.

Figure 5:
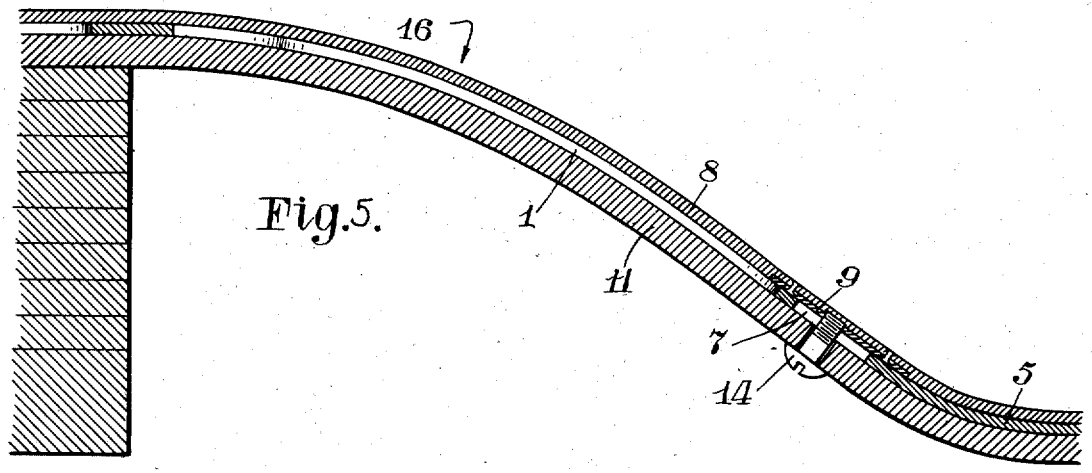
Figure 5 is an enlarged longitudinal section taken on line 7—7 of Figure 9 and showing the manner of applying the adjustable arch support between the inner and outer soles of a shoe.

In the drawings, the arch support appliance is shown as comprising a simple and compact shank of preferably integral structure it being designated 1 and including a narrow shank piece 2, a heel plate 3; a transverse portion 4 and anterior extensions 5.

The arch support appliance is preferably made of spring steel and may be of a uniform thickness; or it may be tapered toward its inner edge as best illustrated in Figure 3. The shank part 2 of the appliance is approximately of the general shape of the shank of the shoe, and is so designed that, when placed in a shoe, it will be effective to directly support the outer longitudinal arch of the foot, and only indirectly support the internal arch because the proximate outer arch is directly supported. The base or heel 3 of the support is preferably provided with an aperture 6 for convenience in lasting the shoe, providing a space for tacks.

Toward the forward part of the support the shank 2 gradually widens into the transverse portion 4, the latter being designed to fit just behind the tread of the sole of the shoe. The vamp spring extensions 5 lie in the general longitudinal direction of the shoe, and may be of any desired number, being preferably made of the same material as the other part of the support, namely a thin piece of spring steel.

Figure 6:
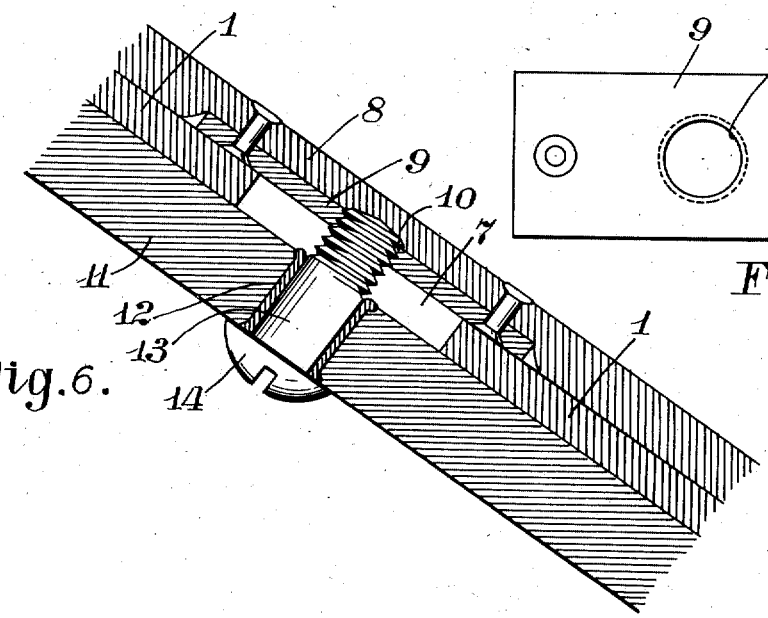
Figure 6 is an enlarged fragmentary detail view of the locking means of Figure 5 and showing the manner of adjustably locking the arch support in any desired position.
Figure 7:
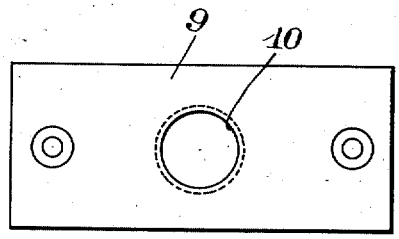
Figure 7 is a detail plan view of the lock plate utilized for locking the arch support in any given position.

When the support 1 is placed between the inner and outer soles of a shoe, as best shown in Figures 5 and 6, the transverse portion 4 of the support is preferably provided with an adjustable slot 7 that extends in the general longitudinal direction of the shoe. In this case the inner sole 8 of the shoe is provided with a suitable lock plate 9, preferably rectangular in form, it being provided with a threaded aperture 10 located to register with the slot 7 of the support 1. The outer sole 11 of the shoe is provided with an aperture 12, and a bushing 13, which bushing is adapted to receive and support a suitable set screw 14, said set screw adapted to pass through the slot 7 in the support 1 and enter and cooperate with the threaded aperture 10.

Figure 9:
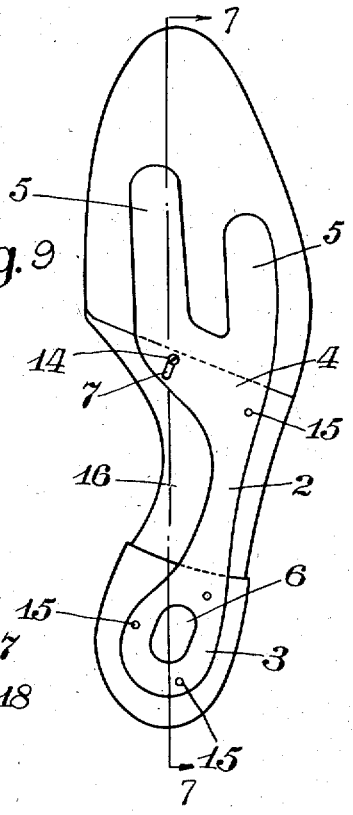
Figure 9 is a bottom plan view of the structure shown in Figure 8.
Figure 10:
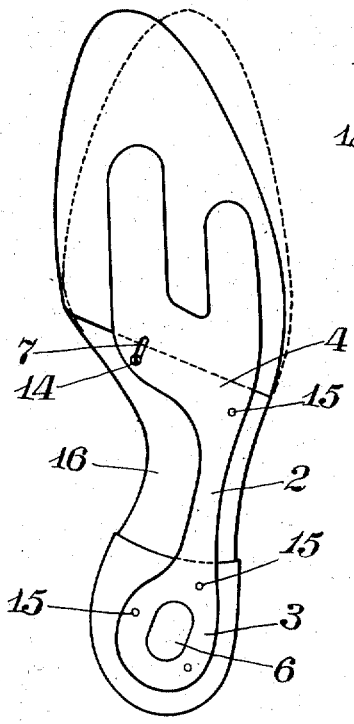
Figure 10 is a bottom plan view of the structure shown in Figure 8 but depicting the shoe as bent inwardly; and also showing the arch support appliance locked in this inner adjusted position.

In order to secure the support 1 to the sole of the shoe it is provided with a series of holes 15 that are preferably arranged as shown in Figures 1 and 10 so as to secure the heel and transverse portion 4 of the support preferably to the inner sole of the shoe. As the heel 3 and transverse portion 4 are secured to the sole of the shoe it will be obvious that whenever the sole of the shoe is pressed or bent inwardly, as shown in Figure 10, the set screw 14, if loosened, will have its position changed in the slot 7 of the support 1, the internal portion of the shank 16 of the shoe may be gradually raised and the screw afterwards set to fix the parts together. When the set screw 14 is tightened the inner shank 16 of the shoe will be locked in any desired vertical position desired in accordance with the relative position of the set screw 14 in the slot 7. The two extremes of this adjustment are best illustrated in Figures 8 to 12.

Figure 8:
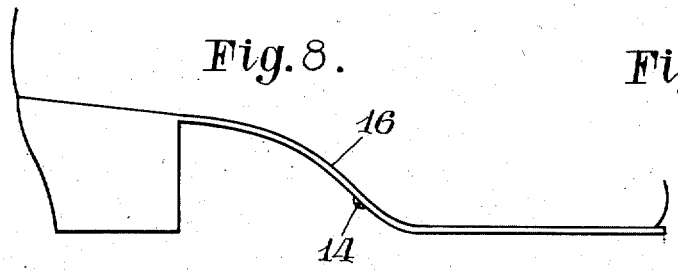
Figure 8 is a diagrammatic side elevation of a shoe provided with the arch support appliance but showing the shoe in initial or non-adjusted position.
Figure 12:
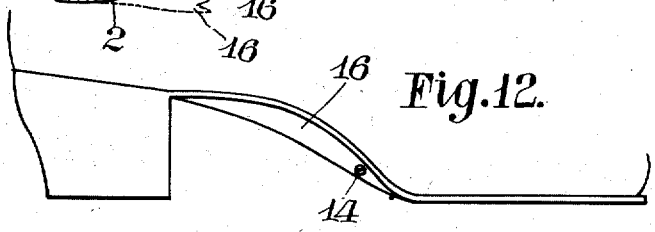
Figure 12 is a diagrammatic side elevation showing the raised inner arch of the shoe after it has been locked in adjusted position.

In Figs. 8 and 9 the support 1 is shown in its normal non-adjusted position with relation to the sole of the shoe. In this position the set screw 14 is in the forward end of the slot 7, the inner part of the shank of the shoe remaining in its normal position. In Figures 10 and 12 the sole of the shoe has been bent inwardly until the set screw 14 is located adjacent the rear or opposite end of the slot 7. When the set screw has been moved to this last described position the internal portion of shank 16 of the shoe is raised to its maximum vertical position. In any position the shank piece 2 of the appliance will be effective to firmly support the inner longitudinal arch of the foot while the internal portion of shank 16 of the shoe may be fixed in one position to flexibly but indirectly support the inner longitudinal arch of a normal foot or it may be gradually adjusted to fit and build up the internal longitudinal arch when it is broken down.

In attaching the arch support appliance to a shoe, the appliance is preferably placed adjacent the outer sole 11 of the shoe, as best shown in Figs. 5 and 6, and positioned transversely and longitudinally relative to the general contour of the shoe. The support 1 is then preferably secured to the inner sole of the shoe by suitable fastening means inserted through the holes 15 in the support. The outer sole 11 is then provided with a suitable set screw 14 adapted to register with the upper end of the slot 7 when the shank of the shoe is in its normal position, the inner sole 8 of the shoe being provided with a lock plate 9, riveted thereto and designed to register with the set screw 14 and slot 7. The position of the part 1 is adjusted by first loosening the screw 14 and then bending, straightening or twisting the shank as a whole and finally securing the part 1 in the changed position by tightening up said screw 14. In said operation the slot 7 permits the necessary movement of the part 1 in respect of the screw 14. The vamp-spring extensions 5 project forward in the vamp of the shoe, and are preferably located between the inner sole 8 and the outer sole 11.

Figure 11:
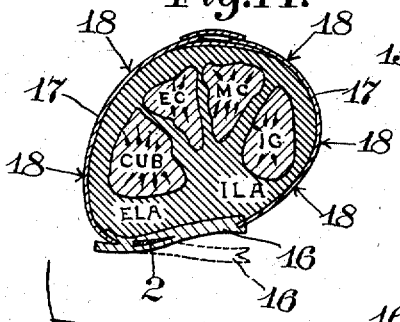
Figure 11 is a diagrammatic view of a cross section of the instep of the foot taken through the transverse tarsal arch; and also showing the manner of supporting the transverse arch, the external arch and the internal arch.

When the foot is placed in the shoe the shank 2 of the support, because directly below the outer longitudinal arch, will firmly support that arch at all times. If the inner longitudinal arch is low the support can be permanently fixed in one position so that the inner shank 16 of the shoe is only slightly elevated, but if the arch is broken and requires gradual raising, or, if the arch is naturally high, the adjustment feature may be utilized to gradually raise the inner shank of the shoe as the arch is gradually raised to its normal position, or the adjustment may be made at once so that the inner shank may be raised to flexibly support the naturally high arch. Such adjustment and the effect thereof are best illustrated in Figure 11, which shows a cross section of the instep of the foot through the transverse tarsal arch, made up of cuboid (CUB), external cuneiform (EC), middle cuneiform (MC) and internal cuneiform (IC) bones. The inner longitudinal arch is designated ILA, in this figure, and the outer longitudinal arch is designated ELA. The inner shank 16 of the shoe is shown in the normal lower position in broken lines and in raised, extreme flexibly supporting position, in solid lines. It will be noted that the shank 2 of the appliance will always firmly support the external longitudinal arch regardless of the position of the shank 16 and it will also be noted that when the flexible inner shank 16 is raised by the adjustment of the support this shank will be effective to flexibly or indirectly support the internal lateral arch. By adjustment of the shank, the upper 17 of the shoe is permitted to grasp the transverse arch and give support by lateral pressure, at the points and in the direction of the arrows marked 18. This also prevents the spreading of the bones in a normal foot, and draws the bones together in a broken, weak or fallen arch. As the shank piece 16 is flexible no harm can result to the muscles in the internal lateral arch.

The operation of the extensions 5, are such that, in ordinary walking, as when the weight is thrown on the ball of the foot, the vamp-spring extensions are brought into action and, as the step is completed by torsal flexion of the ball of the foot, stress is put upon the vamp-spring. The tension thus produced in the vamp-spring prevents extreme bending of the vamp of the shoe, and gives the body a forward spring motion instead of allowing the forward motion and the stress to be felt in and cause a strain on the ball of the foot. By thus minimizing the pressure due to weight and locomotion, the pain from broken arches and inflamed tissues in the ball of the foot may be relieved and ultimately eliminated.

In the modified form of my appliance, as shown in Fig. 4, the device may be used solely as a shank piece comprising the transverse portion 4, shank 2 and heel 3. It will be obvious that in using the shank piece as just described it will be effective to firmly support the longitudinal external arch and flexibly support the corresponding internal arch, while the vamp extensions, when used alone, will be effective to encourage a spring forward in walking without undue weight on the ball of the foot.

It will be seen that I have provided a novel and decidedly simple method and means for supporting arches of the foot, the same being effective to firmly support those arches of the foot that naturally bear the weight and indirectly and yieldingly support and permit exercise of such arches as are intended to be naturally muscular and resilient.

It will also be seen that I have provided a method and appartus for binding, or to prevent from spreading, the tarsal bones of the transverse arch. Furthermore, it will be noted that I have provided a means for encouraging a spring forward in walking without imposing undue weight on the ball of the foot, that portion being the most frequent site of inflammation, pain and calluses in cases of weak, broken or fallen arches.

The forms and dimensions of the parts can be changed without departing from the gist of the invention as claimed.

What I claim is:

1. A shoe having a shank reinforcing element permanently incorporated with the shoe, said reinforcing element including a shank portion of relatively rigid material and extending only beneath the outer longitudinal arch of the foot to support said arch and avoid support of the inner longitudinal arch, and a rear portion extending over the heel of the shoe.

2. In combination with a shoe, a reinforcing element comprising a shank portion mounted to extend only beneath the outer longitudinal arch of the foot, and avoiding direct support of the inner longitudinal arch, a rear portion extending back over the heel of the shoe, a transverse portion extending across the forward end of the shank of the shoe, and means for fixing the inner portion of the shank of the shoe in different adjusted positions.

3. In combination with a shoe, a reinforcing element comprising a shank portion mounted to extend only beneath the outer longitudinal arch of the foot and avoiding direct support of the inner longitudinal arch, a rear portion extending back over the heel of the shoe, and means for fixing the inner portion of the shank of the shoe in different adjusted positions.

4. In combination with a shoe, an element reinforcing the outer portion of the shank of the shoe, mounted to extend principally beneath the outer longitudinal arch of the foot to support said arch and avoid support of the inner side of the instep of the foot, a rear portion extending back over the heel of the shoe, and a transverse portion extending across the shoe in a position near the junction of the shank portion and forepart of the shoe.

5. A shoe having a reinforcing element permanently incorporated with the shoe, said reinforcing element including a portion to reinforce the outer portion of the shank of the shoe and mounted to extend principally beneath the outer longitudinal arch of the foot to support that arch and avoid supporting the inner side of the instep of the foot.

JOHN M. HISS.